United States Patent
Batikoff et al.

(10) Patent No.: US 8,766,606 B2
(45) Date of Patent: *Jul. 1, 2014

(54) POWER ARRAY FOR HIGH POWER PULSE LOAD

(71) Applicant: Elta Systems Ltd., Ashdod (IL)

(72) Inventors: Enrique Batikoff, Nes Tziona (IL); Robert Zelig, Ashdod (IL)

(73) Assignee: Elta Systems Ltd., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,716

(22) Filed: Oct. 4, 2012

(65) Prior Publication Data

US 2013/0027277 A1 Jan. 31, 2013

Related U.S. Application Data

(63) Continuation of application No. 12/810,940, filed as application No. PCT/IL2008/001662 on Dec. 24, 2008, now Pat. No. 8,305,052.

(30) Foreign Application Priority Data

Dec. 27, 2007 (IL) .......................................... 188477

(51) Int. Cl.
  *G05F 1/00* (2006.01)
  *H01Q 21/00* (2006.01)

(52) U.S. Cl.
  USPC ............ 323/222; 323/282; 343/893; 343/853

(58) Field of Classification Search
  None
  See application file for complete search history.

(56) References Cited

U.S. PATENT DOCUMENTS

| 5,073,848 A | 12/1991 | Steigerwald et al. |
| 5,274,539 A | 12/1993 | Steigerwald et al. |
| 5,377,090 A | 12/1994 | Steigerwald |
| 5,418,708 A | 5/1995 | Nairus |
| 5,777,462 A | 7/1998 | Yue |

(Continued)

FOREIGN PATENT DOCUMENTS

| EP | 1 630 570 A1 | 3/2006 |
| SU | 1310966 A1 | 5/1987 |
| WO | WO 2008/111046 A1 | 9/2008 |

OTHER PUBLICATIONS

International Search Report mailed Apr. 21, 2009 for PCT/IL2008/001662.

*Primary Examiner* — Trinh Dinh
(74) *Attorney, Agent, or Firm* — Oliff PLC

(57) ABSTRACT

A controlled power supply comprising: a) an array of low voltage current sources; b) a plurality of switch power supplies coupled to each of the storage capacitors and respective ones of the pulse loads being coupled to each of the switch power supplies; c) each of the storage capacitors being configured for storing energy during an inactive portion of a load switching cycle of the respective switch power supply to which the corresponding storage capacitor is coupled when the pulse loads are inactive; d) a respective output capacitor in association with each of the switch power supplies for feeding voltage to the respective pulse loads during an active portion of the load switching cycle; and e) the respective storage capacitor being configured for supplying the stored energy via the respective to the respective switch power supply to which the storage capacitor is coupled to each of the pulse loads coupled to switch power supply during an active portion of the load switching cycle.

16 Claims, 8 Drawing Sheets

(56) References Cited

U.S. PATENT DOCUMENTS

| | | |
|---|---|---|
| 6,798,177 B1 | 9/2004 | Liu et al. |
| 7,385,376 B2 | 6/2008 | Zolfaghari |
| 7,489,198 B1 | 2/2009 | Cepas et al. |
| 7,656,141 B1 * | 2/2010 | Granat ................. 323/284 |
| 8,305,052 B2 * | 11/2012 | Batikoff et al. ........ 323/222 |
| 8,487,597 B2 * | 7/2013 | Zelig et al. ............ 323/282 |
| 2002/0036486 A1 | 3/2002 | Zhou et al. |
| 2004/0062058 A1 | 4/2004 | Hann et al. |
| 2004/0178950 A1 | 9/2004 | Arvidsson |
| 2004/0257271 A1 | 12/2004 | Jacobson et al. |
| 2010/0102787 A1 | 4/2010 | Zelig et al. |
| 2011/0006969 A1 * | 1/2011 | Batikoff et al. ........ 343/904 |
| 2013/0027277 A1 * | 1/2013 | Batikoff et al. ........ 343/893 |

\* cited by examiner

Duty Cycle 10%

| Module | Module Qty | Load Qty | Vin | Iinp | In avg | Pin_p | Pin_avg | Vout | Iout_p | Iout avg | Pout_p | Pout avg | Eff. |
|---|---|---|---|---|---|---|---|---|---|---|---|---|---|
| TR | 10,368 | | 8.7 | 9 | 0.9 | 78 | 7.8 | | | | | 2.0 | 25.5% |
| SPS | 648 | 16 | 220 | 6.7 | 0.7 | 1,474 | 147.4 | 8.7 | 144.0 | 14.4 | 1,253 | 125.3 | 85% |
| HVPS | 24 | 27 | 270 | 173.4 | 17.3 | 46,817 | 4,681.7 | 220 | 180.9 | 18.1 | 39,795 | 3,979.5 | 85% |
| Wall (RFI_F) | 4 | 6 | 270 | 1,050.9 | 105.1 | 283,742 | 28,374.2 | 270 | 346.8 | 34.7 | 280,905 | 28,090.5 | 99% |
| Antenna | 1 | 4 | 270 | 4,203.6 | 420.4 | 1,134,968 | 113,497 | 270 | 1,401.2 | 140.1 | 1,134,968 | 113,496.8 | 100% |

FIG. 2

| Module | Module Qty | Load Qty | Vin | Iinp | In avg | Pin_p | Pin_avg | Vout | Iout_p | Iout avg | Pout_p | Pout avg | Eff. |
|---|---|---|---|---|---|---|---|---|---|---|---|---|---|
| TR | 10368 | | 8.7 | 9 | 0.9 | 78.30 | 7.8 | | | | | 2.0 | 26% |
| SPS | 648 | 16 | 70 | 2.53 | 2.11 | 176.87 | 147.4 | 8.7 | 144.0 | 14.4 | 1,253 | 125.3 | 85% |
| LVPS-CS | 24 | 27 | 270 | 20.8 | 17.3 | 5,618 | 4,682 | 70 | 68.2 | 56.8 | 4,775 | 3,979 | 85% |
| Wall (RFI_F) | 4 | 6 | 270 | 126.1 | 105.1 | 34,049 | 28,374 | 270 | 41.6 | 34.7 | 33,709 | 28,090 | 99% |
| Antenna | 1 | 4 | 270 | 504.4 | 420.4 | 136,196 | 113,497 | 270 | 168.1 | 140.1 | 136,196 | 113,497 | 100% |

FIG. 4

POWER ARRAY FOR HIGH POWER PULSE LOAD

This is a Continuation of application Ser. No. 12/810,940 filed Sep. 22, 2010, which claims the benefit to International Application No. PCT/IL2008/001662 filed Dec. 24, 2008 and Israeli Application No. 188477 filed Dec. 27, 2007. The disclosure of the prior applications is hereby incorporated by reference herein in its entirety.

FIELD OF THE INVENTION

This invention relates to pulse load switching power supplies that is particularly suitable for use in phased array radar antennas.

BACKGROUND OF THE INVENTION

Some types of phased array antennas require that a large numbers of antenna elements be activated simultaneously. This, of course, demands significant power, which is provided by the main system power supplies. The incremental contribution that each antenna element makes to the composite beam is, of course, a feature of the antenna design and so it is possible to determine in advance which antenna elements to energize and at what voltage magnitude in order to achieve a desired beam steering and tracking. Each antenna element is energized according to the pulse width to be transmitted so that there is an instantaneous demand for the time period when the antenna element is active followed by an inactive period when the antenna elements are waiting for the next transmitting pulse. However, the sudden current surges thus consumed when the antenna element becomes active place a severe demand on the system power supplies. It is therefore clearly desirable to energize the antenna elements in such a manner that the current surges are reduced.

It will be apparent from the foregoing discussion that each antenna element operates as a pulsed or switched load which requires a large supply of power intermittently. Conventional solutions using switching mode power supplies for such a load struggle to avoid the output voltage dropping during the transmission pulse and reflecting the load power requirements to the main system power supplies. The ripple current in the current supplied by the main power supply can cause high radio frequency interference RFT which is reflected on to the main supply source if it is not suppressed.

The circuit that converts source input voltage DC to pulsed AC is known as a switching converter or simply 'converter' of which there are two principal types, 'Buck' and 'Boost' although there are several hybrids and variations. The Buck converter normally converts the voltage down so that the output voltage of the converter is lower than the input voltage to the converter by a factor $\delta$ that is equal to the duty cycle of the switch. Duty cycle is the ratio between the duration during each cycle that the switch is ON to the total time between successive pulses, i.e. the period, i.e.

$$V_{OUT} = \delta \cdot V_{IN}$$

$$\delta = \frac{T_{ON}}{T} = \frac{T_{ON}}{(T_{ON} + T_{OFF})}$$

where:
$V_{IN}$=input voltage;
$V_{OUT}$=input voltage;
$\delta$=Duty cycle $T_{ON}$=Time when switch is ON
$T_{OFF}$=Time when switch is OFF
T=Pulse period=$(T_{ON}+T_{OFF})$ The Boost converter converts the voltage up so that the output voltage of the converter is higher than the input voltage by a factor $$\frac{1}{1-\delta},$$

where $\delta$ is equal to the duty cycle of the switch. Since $\delta$ is less than 1, this factor is greater than 1.

It thus emerges from the foregoing discussion that regardless of the type of converter that is employed, the output voltage of the converter is a function of the duty cycle of the switch. This allows accurate regulation of the voltage simply by controlling the duty cycle of the switch voltage, and this is easily achieved using pulse width modulation, PWM to control the pulse width during which the switching voltage pulse is ON. Since the period of the switching voltage pulse remains constant, adjusting the pulse width of the ON time varies the duty cycle of the switching voltage.

US 2004/178950 discloses a method of controlling a switching element in a switching regulator power supply of a radar. The method of controlling the switching element comprises only switching the switching element during predetermined time intervals, the predetermined time intervals advantageously being sample intervals of a pulse repetition interval of the radar. Thereby by having knowledge of the time intervals the switching element is switching, being able to remove or diminish any influence the switching can have on the quality of received signals and subsequent processing of these signals.

US 2004/062058 discloses a power conversion unit and method for efficient conversion of power for one or more variable loads such as a radar system. Power having a first form is supplied to one or more power conversion units (PCUs) connected to the one or more variable loads. The PCUs are adapted to convert the power from the first form to other forms suitable for use by the components of the destination system. Based at least in part on a predicted load requirement of the variable load, the operation of the PCUs can be controlled to provide sufficient power to the one or more loads at the appropriate time while minimizing wasted power generation by deactivating any unnecessary PCUs during a decrease in power consumption or by activating PCUs during an increase in power consumption. Additionally, based at least in part on a predicted temporary change in the load requirements, the PCU can change its output voltage in anticipation of the temporary change in the load requirement, such as by increasing the output voltage to provide additional energy to the one or more variable loads during a temporary increase in power consumption or by decreasing the output voltage during a temporary decrease in power consumption.

U.S. Pat. No. 5,418,708 discloses a constant power load bank for simulating avionics loads such as pulsing radars on a 270 VDC power system. The load bank is designed to realistically simulate an active aperture radar with 0-100% of the load pulsing while the remainder of the load is either on or off. The pulse controls are designed to simulate any type of pulsing scenario from simple (one control signal) to complex (multiple control signals simulating incremental load application and removal such as an active aperture radar load).

IL 181843 entitled "Controlled power supply and method for pulse load" by the same inventors of the present application and filed Mar. 11, 2007 in the name of the present applicant discloses a method and a controlled power supply for supplying bursts of substantially constant voltage to a switched load via a voltage reservoir, typically constituted by a storage capacitor. Based on a predetermined current that is to be sourced by the load during an active portion of a switching cycle, an average current is computed that should be fed to the voltage reservoir during an inactive portion of the switching cycle to ensure that sufficient energy will stored in the storage capacitor to supply the load without completely draining the storage capacitor. Continuous energy is fed to the storage capacitor at a substantially constant current equal in magnitude to the computed average current.

The complete contents of all the above references are hereby incorporated herein by reference to the extent that they provide useful background. However, since the present invention is a specific application of the power supply described in IL 181843, which has not yet been published, the relevant details of IL 181843 will be described substantially verbatim so as to provide a completely enabling description.

In the related art, an RFI filter at the input of the power supply is used to filter the radio frequency interference so that RFI is not reflected on to the main supply source. Maintaining the ripple current as low as possible also diminishes the conduction losses related to high root mean square (RMS) current values, which reduce the current delivery capability of the supply source. However, when a switch power supply is used in conventional circuits for supplying power as intermittent current bursts, the sudden current burst reflects on the line causing sudden and intermittent voltage reductions on the line. When very high power bursts are being supplied, the RFI filter becomes bulky and expensive.

FIG. 1 shows the topology of a conventional prior art power supply array 10 for feeding DC power to antenna elements 11 of a phased array antenna and FIG. 2 is a table showing typical parameters associated with the power supply array 10. In order to provide a radar system that can track in four directions, four antenna arrays are provided each on a respective "wall" 12, there being one wall 12 for each surface of the system as explained above. Each wall 12 comprises an array of high voltage power supplies 13 that are energized by the system power supplies and each of which feeds high voltage rectified DC voltage to a plurality of switch power supplies 14 via smoothing capacitors 15 coupled at the output of the high voltage power supplies 13 and which serve to reduce voltage ripple of the high voltage power supplies 13. Capacitors 16 at the input to each of the switch power supplies 14, which may be located remote from the high voltage power supplies 13, serve to decouple the switch power supplies 14 from the high voltage power supplies 13. Each of the switch power supplies 14 has a respective output capacitor 17 that feeds voltage to the respective antenna element 11 that serves as a pulse load.

FIG. 2 is a table showing a breakdown of the operating parameters of the power supply array 10 shown in FIG. 1. Thus, starting from the bottom of the table each wall 12 accommodates a single phase array antenna, thus resulting in a total of four phase array antennas. Each of the four walls 12 houses six high voltage power supplies 13, thus resulting in a total of 24 high voltage power supplies 13. Each of the 24 high voltage power supplies 13 is coupled to 27 switch power supplies 14, thus resulting in a total of 648 switch power supplies 14. Each of the switch power supplies 14 supplies 16 antenna elements 11, thus resulting in a total of 10368 antenna elements 11. Now working down from the top of the table, it is assumed that each of the 10368 antenna elements 11 requires that the input voltage across the output capacitor 17 of the corresponding switch power supply 14 is 8.7 volts and it is also assumed that input current (Iinp) to each antenna element 11 is 9 ampere, thus requiring an input power (Pin_p) of 78.3 watts to each antenna element 11, when active. Assuming a 10% duty cycle, this means that when the antenna element 11 is active i.e. draws power from the switch power supply 14, the average power (Pin_avg) drawn by each antenna element 11 is 7.8 watts. The output power (Pout_p) of each antenna element 11 is assumed to be 20 watts based on the efficiency typically achieved by the antenna elements making an efficiency of 26% since the input power (Pin_p) is 78.3 watts.

Having thus determined the operating parameters of each antenna element 11 within each switch power supply 14, we can now work our way down the table and compute the operating parameters of the switch power supplies 14. In like manner, we can then determine the operating parameters of each high voltage power supply 13, then of each wall 12 and finally of the complete power supply array 10. Although the results are tabulated in FIG. 2, for the sake of completeness we will now show how the salient results are derived assuming that the input voltage (Vin) to the antenna is 270 volts.

The output power (Pout_p) of each switch power supply 14 is equal to the power (78.3 watts) fed to each antenna element 11 multiplied by the number (16) of antenna elements 11 in each switch power supply 14, i.e. 1252.8 watts. The input power (Pin_p) to each switch power supply 14 is equal to the output power (Pout_p) divided by the efficiency, estimated at 85% this being a typical efficiency of a switching mode power supply, i.e. 1,474 watts. The input current (Iinp) to each switch power supply 14 is equal to the input power (Pin_p) i.e. 1,474 watts divided by the input voltage (Vin) assumed to be 70 volts, this value being selected to keep the capacitor voltage low enough and avoid large currents, thus making the input current (Iinp) equal to 21.1 ampère.

Similarly, the output power (Pout_p) of each high voltage power supply 13 is equal to the power (1,474 watts) fed to each switch power supply 14 multiplied by the number (27) of switch power supplies 14 in each high voltage power supply 13, i.e. 39,795 watts. The input power (Pin_p) to each high voltage power supply 13 is equal to the output power (Pout_p) divided by the efficiency, again estimated at 85%, i.e. 46,817 watts. The input current (Iinp) to each high voltage power supply 13 is equal to the input power (Pin_p) i.e. 46,817 watts divided by the input voltage (Vin) assumed to be 270 volts this being approximately equal to the voltage obtained by a 3-phase full wave rectifier of a 115V system (i.e. $115*\sqrt{2}*\sqrt{3}$), thus making the input current (Iinp) equal to 173.4 ampère.

By similar reasoning it can be shown that the output power (Pout_p) of each wall 12 is equal to the power (46,817 watts) fed to each high voltage power supply 13 multiplied by the number (6) of high voltage power supplies 13 in each wall 12, i.e. 280,905 watts. The input power (Pin_p) to each wall 12 is equal to the output power (P_p) divided by the efficiency, estimated at 99% owing to wires and connector losses, i.e. 283,742 watts. The input current (Iinp) to each wall 12 is equal to the input power (Pin_p) i.e. 283,742 watts divided by the input voltage (Vin), again assumed to be 270 volts, thus making the input current (Iinp) to each wall 12 equal to 1,051 ampère.

Finally, since the complete phase array antenna comprises four walls, it can be shown that the output power (Pout_p) of the complete antenna is equal to the power (283,742 watts) fed to each wall 12 multiplied by the number (4) of walls 12 in the complete antenna, i.e. 1,134,968 watts. The input power (Pin_p) to the complete antenna is equal to the output power (Pout_p) divided by the efficiency, assumed to be 100%, i.e. 1,134,968 watts. The input current (Iinp) to the complete antenna is equal to the input power (Pin_p) i.e. 1,134,968 watts divided by the input voltage (Vin), assumed to be 270 volts, thus making the input current (Iinp) to the complete antenna equal to 4,204 ampère.

Having established the operating parameters of the power supply array 10 and its sub-components, we can now calculate the values of the capacitors 15, 16 and 17 as follows.

The energy stored in a capacitor C charged to a voltage V is given by:

$$E = 0.5 * C * V^2 \quad (1)$$

The energy required by a power pulse of amplitude W and duration (width) $t_w$ is given by:

$$E = W * t_w \quad (2)$$

Given that the energy is delivered to the load by discharging the energy stored in a capacitor from an initial voltage $V_i$ to final voltage $V_f$, the amount of energy thus required is obtained by:

$$E = 0.5 * C * (V_i^2 - V_f^2) \quad (3)$$

Assuming that for a pulse transmitter, the allowable time to restore the delivered energy to the storage capacitor is a single pulse repetition interval (PRI), this can be achieved by feeding current from a current source into a storage capacitor, so that the integrated current during a single PRI fully charges the capacitor. In this case, the value of the required capacitor is given by:

$$C = \frac{E}{0.5 * (V_i^2 - V_f^2)} \quad (4)$$

This equation assumes that the efficiency is 100%. But in practice the efficiency is less than 100% and therefore equation (4) must be modified as follows:

$$C = \frac{E}{0.5 * (V_i^2 - V_f^2)} * \frac{1}{\eta} \quad (5)$$

where $\eta$ is the efficiency. In saying this, it is to be noted that in the following analysis the efficiency, $\eta$, does not refer to the efficiency of the capacitor, which is assumed to be 100%, but rather to the efficiency of power conversion between the high voltage power supplies 13 and the switch power supply 14 to which the output capacitor is connected. This distinction is important because when the initial voltage $V_i$ used in equation (4) is directly derived from the voltage of the switch power supply 14, the efficiency, $\eta$, may be assumed to be 100%. On the other hand, when the initial voltage $V_i$ used in equation (4) is derived from the voltage of the high voltage power supplies 13, the conversion efficiency, $\eta$, which of course is less than 100%, must be factored in.

By substituting for E from equation (2) into equation (4) we obtain:

$$C = \frac{W * t_w}{0.5 * (V_i^2 - V_f^2)} * \frac{1}{\eta} \quad (6)$$

For example if the required output pulse power is 5 KW and the transmitted pulse is 100 μsec width, and the allowed voltage drop across an input capacitor charged to an initial voltage of 70V is 50V (i.e. $V_f = 20V$), then using equation (6) and assuming an efficiency $\eta$ of 100%, it can be shown that the value of the required storage capacitor is 220 μF.

We have already determined that in the power supply array 10 shown in FIG. 1, the input power (Pin_p) for each high voltage power supply 13 is 46,817 watts. So, by same reasoning, if the width of the transmitted pulse is 100 μsec and the permitted voltage drop across the storage capacitor having an initial voltage of 270V is 2V, then using equation (6) and assuming an efficiency $\eta$ of 85%, it can be shown that the value of the required storage capacitor is given by.

$$C = \frac{39,795 * 100}{0.5 * (270^2 - 268^2)} \mu F = 7,397 \ \mu F \quad (7)$$

It should be understood that while the efficiency, $\eta$ of 85% does not appear discretely in equation (7), it is taken into account by virtue of the fact that the input power (Pin_p) for the high voltage power supply 13 is 46,817 watts, while the output power (Pout_p) is 39,795 watts, which is equivalent to an efficiency of 85%.

In other words, each storage capacitor 15 in the power supply array 10 must be rated over 7,000 μF at 300V. Each such capacitor is huge and bulky and there are some 24 such capacitors required in total, i.e. one for each high voltage power supply 13.

Likewise, assuming that the output capacitor 17 for each antenna element 11 operating at 8.7V and an RF output peak power of 20 W and assuming an efficiency $\eta$ of 26%, may be subjected to a voltage drop of 0.5V and a 15 μs recovery time the value of the output capacitor 17 is given by:

$$C = \frac{20 * 15}{0.5 * (8.7^2 - 8.2^2)} * \frac{1}{0.26} \mu F = 277 \ \mu F \quad (8)$$

The efficiency, $\eta$ of 26% must be taken into account in equation (8) because the power of 20 W is the output power of the capacitor that is fed to the antenna element, while the initial voltage of 8.7V is derived from the switch power supply 14. Therefore, the efficiency in converting the input power (Pin_p) of the switch power supply 14 (i.e. 78 W) to the output power (20 W) fed to the antenna element must be factored in.

In the power supply array 10 shown in FIG. 1 where there are 10368 antenna elements 11 in total, some 10368 such output capacitors are required.

Yet a further drawback with such a circuit topology where 16 antenna elements are powered by each switch power supply 14 is that failure of a switch power supply 14 results in 16 antenna elements becoming inoperative and this, of course, may impact adversely on the magnitude and shape of the antenna beam. This drawback may to some extent be mitigated by powering antenna elements that can never be energized simultaneously owing to their being on mutually opposing walls among different switch power supplies. However, while this reduces the adverse effect of such a failure it still results in multiple antenna elements becoming inoperative in the event of a failure in a switch power supply 14.

It would therefore be desirable to provide a power supply array for energizing antenna elements of a phase array antenna wherein much smaller input and output capacitors may be used and which lends itself more efficiently to independent operation of each antenna element so as to reduce the number of inoperative multiple antenna elements in the event of a faulty switch power supply.

SUMMARY OF THE INVENTION

It is an object of the invention to provide a power supply array for energizing a plurality of pulse loads such as antenna elements of a phase array antenna wherein much smaller input and output capacitors may be used.

It is a further object to provide such a power supply array which lends itself more efficiently to independent operation of each pulse load so as to reduce the number of inoperative pulse loads in the event of a faulty switch power supply.

According to a first aspect of the invention there is provided a method for supplying bursts of substantially constant voltage to a plurality of pulse loads, the to method comprising:

provide an array of low voltage current sources each for feeding constant DC current at a nominal voltage to a respective storage capacitor each of which is coupled to a plurality of switch power supplies;

coupling each of the switch power supplies to respective ones of the pulse loads;

storing energy in each of the storage capacitors during both active an inactive portion of a load switching cycle of the respective switch power supply to which the corresponding storage capacitor in association with each of the switch power supplies for feeding voltage to the respective pulse loads during an active portion of the load switching cycle; and supplying the stored energy in the respective storage capacitor via the respective to the respective switch power supply to which the storage capacitor is coupled to each of the pulse loads coupled to switch power supply during an active portion of the load switching cycle.

According to a second aspect of the invention, there is provided controlled power supply (10) for supplying bursts of substantially constant voltage from a voltage reservoir (18) to a plurality of pulse loads via a load switch (13), said power supply including:

an array of low voltage current sources each for feeding constant DC current at a nominal voltage to a respective storage capacitor;

a plurality of switch power supplies coupled to each of the storage capacitors and respective ones of the pulse loads being coupled to each of the switch power supplies;

each of the storage capacitors being configured for storing energy during an inactive portion of a load switching cycle of the respective switch power supply to which the corresponding storage capacitor is coupled when the pulse loads are inactive;

a respective output capacitor in association with each of the switch power supplies for feeding voltage to the respective pulse loads during an active portion of the load switching cycle; and the respective storage capacitor being configured for supplying the stored energy via the respective to the respective switch power supply to which the storage capacitor is coupled to each of the pulse loads coupled to switch power supply during an active portion of the load switching cycle.

BRIEF DESCRIPTION OF THE DRAWINGS

In order to understand the invention and to see how it may be carried out in practice, an embodiment will now be described, by way of non-limiting example only, with reference to the accompanying drawings, in which:

FIG. 2 is a table showing typical operating parameters for the power supply array illustrated in FIG. 1;

FIG. 4 is a table showing typical operating parameters for the power supply array illustrated in FIG. 2;

FIG. 8 is a timing diagram of the voltage waveform at the input of the DC-DC converters connected to antenna elements shown in FIG. 7a;

DETAILED DESCRIPTION OF EMBODIMENTS

Figure 1:
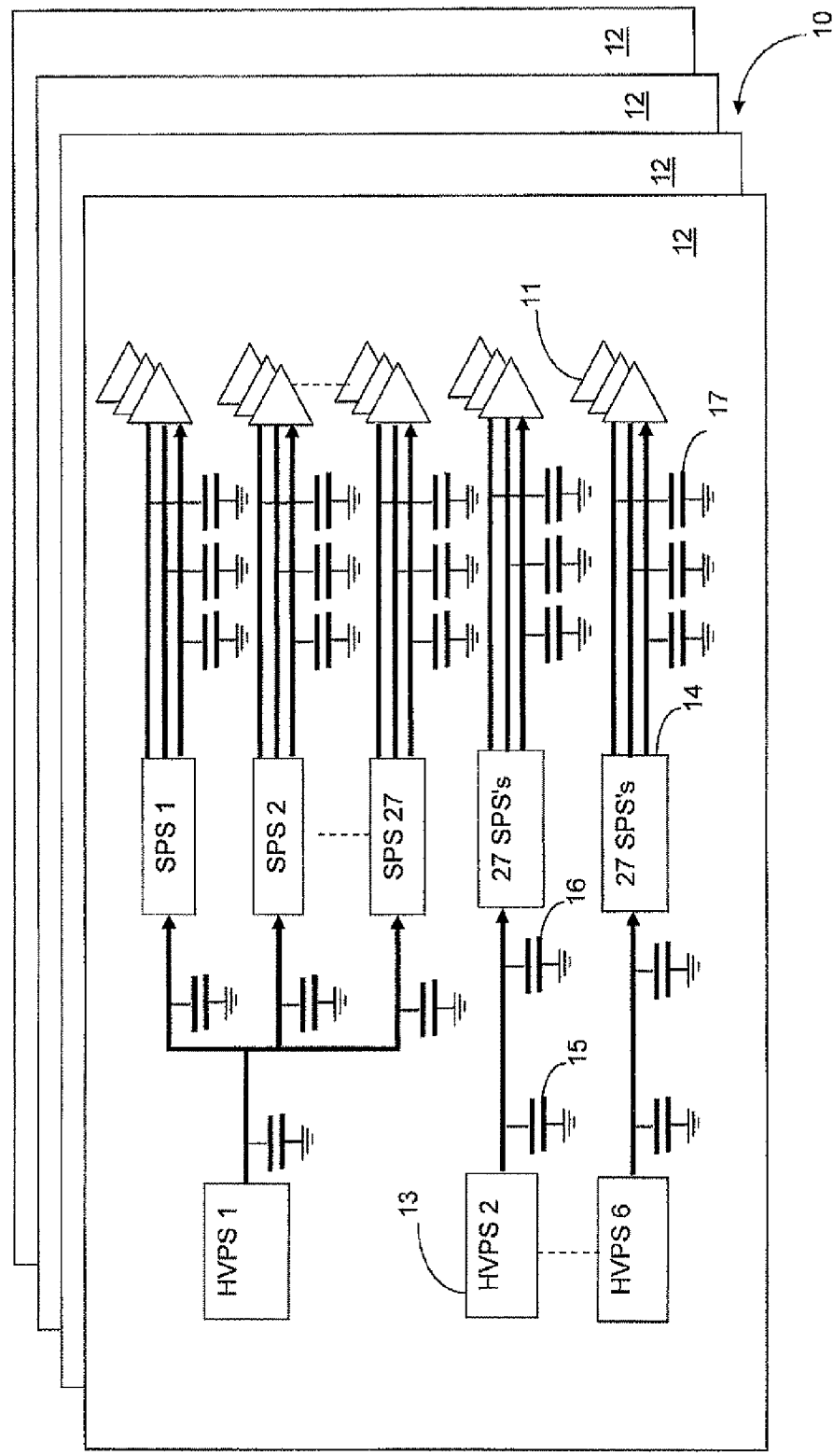
FIG. 1 is a schematic representation showing the topology of a prior art power supply array for feeding a pulse load.

In the following description of an embodiment of the invention, components that are common to the power supply array 10 described above with reference to FIG. 1 or serve a common function thereto will be identified by identical reference numerals.

Figure 3:
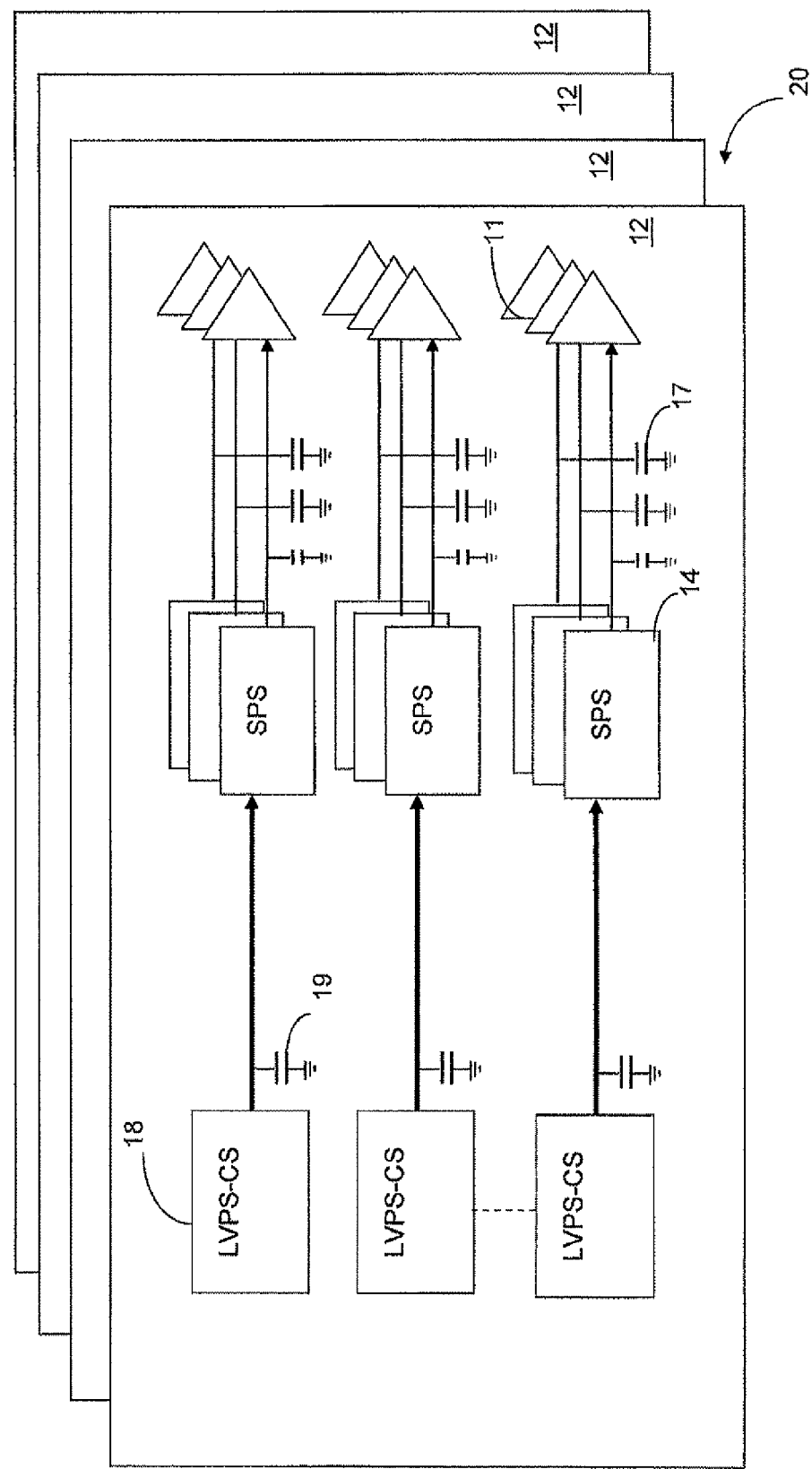
FIG. 3 is a schematic representation showing the topology of a power supply array for feeding a pulse load according to an embodiment of the invention.

FIG. 3 shows the topology of a power supply array 20 according to the invention for feeding DC power to antenna elements 11 (constituting pulse loads) of a phase array antenna. Thus, here also, four antenna arrays are provided each on a respective wall 12, there being one wall 12 for each surface of the aircraft as explained above. Each wall 12 comprises an array of low voltage current sources 18 that are energized by high voltage power supplies at a voltage of 270V and each of which serves as a constant DC current source for feeding constant current at a nominal voltage of 70V to a respective storage capacitor 19 each coupled to a plurality of switch power supplies 14. Each of the storage capacitors 19 serves as a voltage reservoir for storing energy during an inactive portion of a load switching cycle of the switch power supplies 14 to which it is coupled when the antenna elements 11 are inactive and for supplying stored energy to the antenna elements 11 during an active portion of the load switching cycle. Each of the switch power supplies 14 has a respective output capacitor 17 that feeds voltage to the respective antenna element 11 that serves as a pulse load. The current sources 18 and the switch power supplies 14 cooperate as a controlled power supply for supplying bursts of substantially constant voltage of magnitude 8.7V to each antenna element 11 (constituting a switched load) via the storage capacitor 19 (constituting a voltage reservoir) as described in above-mentioned IL 181843 and as repeated in detail below with reference to FIGS. 5 to 10 of the drawings.

FIG. 4 is a table showing a breakdown of the operating parameters of the power supply array 20 shown in FIG. 3. Thus, starting from the bottom of the table each wall 12 accommodates a single phase array antenna, thus resulting in a total of four phase array antennas. Each of the four walls 12 houses six low voltage current sources 18, thus resulting in a total of 24 low voltage power supplies 18. Each of the 24 low voltage power supplies 18 is coupled to 432 switch power supplies 14, thus resulting in a total of 10368 switch power supplies 14. Each of the switch power supplies 14 supplies a single antenna element 11, thus resulting in a total of 10368 antenna elements 11, i.e. the same number as in FIG. 1 thus providing a fair comparison between the arrangement shown in FIG. 3 with that of FIG. 1. It is thus to be noted at the outset that each switch power supply 14 operates a single antenna element 11 unlike the arrangement shown in FIG. 1 where each switch power supply 14 operates 16 antenna elements 11. Consequently, in the arrangement shown in FIG. 2, a failure in a switch power supply 14 will result in only a single antenna element 11 becoming inoperative. In saying this, it is to be noted that while this clearly represents a significant advantage over the topology shown in FIG. 1, the invention also contemplates that multiple antenna elements 11 may be shared by a single switch power supply 14. It will emerge from the following discussion that unlike the conventional arrangement shown in FIG. 1, the invention renders practical the possibility of powering each single antenna element 11 by a single switch power supply 14. However, it is of course feasible to share two mutually opposing antenna elements 11 between a single switch power supply 14 so that in the event of a failure in the switch power supply 14, only a single antenna element in the active phase array will be adversely affected. Likewise, a single switch power supply 14 may be used to supply power to more than two antenna elements 11 that are in different phase arrays and/or are otherwise so distributed so that the overall deterioration to each phase array consequent to a faulty switch power supply 14 will be minimal.

FIG. 4 is configured in an identical manner to FIG. 2 and will therefore not be described in detail other than to remark that the first line of the table (TR) shows the operating parameters of each antenna element 11 (constituting a pulse load) assuming an input voltage (Vin) of 8.7V and an input current (Iinp) of 9 A. Once the operating parameters of each antenna element 11 within each switch power supply 14 are determined, we can now work our way down the table and compute the operating parameters of the switch power supplies 14, then of each low voltage current source 18, then of each wall 12 and finally of the complete power supply array 20. Since the results are tabulated in FIG. 4 and a detailed explanation of their derivation has already been presented with reference to FIG. 2, no further description will be given.

If the tables shown in FIGS. 2 and 4 are compared, it emerges that although the same number (10368) of antenna elements 11 are powered in the arrangements of FIGS. 1 and 3, respectively, in the power supply array 20 shown in FIG. 3, the input power (Pin_p) delivered by each current source (LVPS-CS) to 27 low voltage SPS's 14 is 5,618 W and is substantially constant with time as compared with the much higher 46,817 W required by the high voltage power supplies 13 of FIG. 1. Thus, assuming that the storage capacitor has an initial voltage of 70V, a permitted voltage drop of 50V and a 100 µs pulse width and assuming SPS's efficiency η of 85%, then using equation (5), it can be shown that the value of the required storage capacitor for each array of 27 SPS's is given by:

$$C = \frac{5{,}618 * 100 * 0.85}{0.5 * (70^2 - 20^2)} \mu F = 212.5 \ \mu F \tag{9}$$

Likewise, assuming that the output capacitor 17 for each switch power supply 14 having an output voltage of 8.7V may be subjected to a voltage drop of 0.5V and a 15 µs recovery time the value of the output capacitor 17 is given by:

$$C = \frac{78 * 15}{0.5 * (8.7^2 - 8.2^2)} \mu F = 278 \ \mu F \tag{10}$$

It thus emerges from FIGS. 3 and 4 that by feeding constant current at low voltage to a storage capacitor during the inactive part of the load switching cycle, sufficient voltage can be stored to completely supply power to the antenna elements. Moreover, the equivalent input capacitor to the switch power supplies for a pulse power level of 46,817 watts is now C=278*6=1,668 µF (at a voltage level of 70V) instead capacitor value of 10,238 µF (at a voltage level of 270V) required by the conventional solution, the stored energy thus being reduced by a factor of about 600.

This having been explained, we will now describe with reference to FIGS. 5 to 11 a circuit for realizing the switch power supply 14 in FIG. 3.

Figure 5:
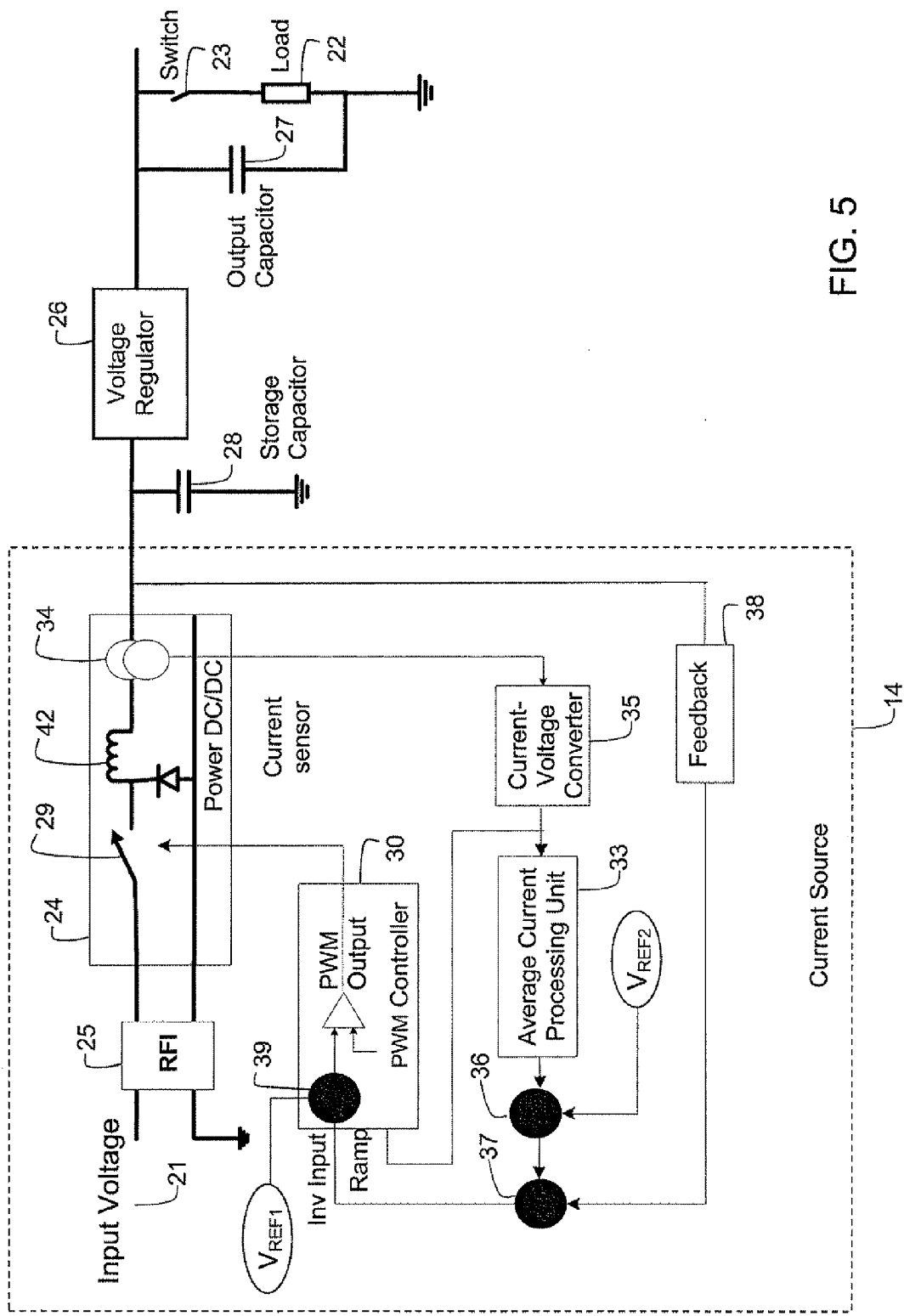
FIG. 5 is a block diagram showing functionality of a controlled power supply according to an embodiment of the invention for use in the power supply array depicted in FIG. 2.

FIG. 5 illustrates a controlled power supply arrangement 14 for supplying bursts of substantially constant voltage from a voltage source 21 to a switched load 22 via a controlled load switch 23, in accordance with an embodiment of the present invention. In the case where the pulse loads are antenna elements of a radar phase array, the voltage source 21 may, for example, be a system supply bus having a rectified line voltage. It could equally well be a bank of batteries configured to provide a required line voltage. An input of a switching converter 24 (constituting a DC current source) is connected to the voltage source 21 via an optional input filter 25. An output of the switching converter 24 is connected to a voltage regulator 26 whose output is connected to an output capacitor 27 connected across the switched load 22. The switching converter 24 includes as part of its output a voltage reservoir for storing voltage, which for the sake of explanation is shown as a storage capacitor 28 that is external to the switching converter 24. The switching converter 24 may be a Buck or Boost Converter as explained above and includes a switching element constituted by a PWM switch 29 that is controlled by a PWM controller 30. The PWM controller 30 is responsive to a first voltage reference $V_{REF1}$ for varying the average output voltage fed to the storage capacitor 28, which stores energy during that portion of the duty cycle when the PWM switch is ON. The storage capacitor 28 feeds voltage to the voltage regulator 26, which ensures that the voltage across the output capacitor 27 remains substantially constant and thus able to provide voltage to the load 22 whenever the load switch 23 is closed.

The voltage regulator 26 is a DC/DC variable input constant output (VICO) device and ensures that the voltage across the output capacitor 27 remains substantially constant. Under such circumstances, the energy that is fed to the load 22 when the load switch 23 is closed is effectively supplied by the storage capacitor 28, since, even when the load switch 23 is closed, the voltage across the output capacitor 27 remains almost constant. Thus most of the energy supplied to the load 22 emanates from the voltage stored in the storage capacitor 28 during that portion of the duty cycle when the PWM switch 29 is ON. The storage capacitor 28 thus constitutes a voltage reservoir for feeding substantially constant voltage to the load 22.

The power supply 14 operates to charge the storage capacitor 28 continuously during an inactive portion of the switching cycle of the load switch 23 when the load switch 23 is open, so that sufficient voltage is stored in the storage capacitor 28 to supply the load 22 during an active portion of the switching cycle when the load switch 23 is closed. Since the power supply arrangement 14 is intended for supplying short, intermittent voltage bursts to the load 22, the inactive portion of the switching cycle is much longer than the active portion. In other words, the load switch 23 has a low duty cycle. This allows energy to be stored continuously and gradually during the inactive portion of the switching cycle at a rate that ensures that sufficient voltage is stored in the storage capacitor 28 to supply the load 22 while avoiding sudden voltage surges that would give rise to corresponding drop in the line voltage. This requirement is met by an average current processing unit 33 that does two things. First, based on a predetermined current that is to be sourced by the load 22 during the active portion of the switching cycle of the load switch 23, it computes an average current that should be fed to the storage capacitor 28 during the much longer inactive portion of the switching cycle to ensure that sufficient energy will be stored in the storage capacitor 28 to supply the load without completely draining the storage capacitor 28. The predetermined current may be computed or estimated based, for example, on previous load characteristics. Secondly, the average current processing unit 33 controls the duty cycle of the PWM switch 29 in the switching converter 24 so as to feed the computed current to the storage capacitor 28. In a practical implementation of the invention, the average current processing unit 33 may be a computer that controls the load switch 23, as well as the PWM switch 29, and which also determines the voltage to be fed to the load 22 as well as the duty cycle of the load switch 23 needed to achieve this voltage.

The manner in which the required control of the switching converter 24 is performed is as follows. A current sensor 34 senses the DC current at the output of the switching converter 24 and a current-to-voltage converter 35 coupled to the current sensor 34 produces a corresponding voltage that is proportional to the measured current. The average current processing unit 33 operates to feed the resulting voltage to the negative input an error comparator 36, whose positive input is connected to a second voltage reference, $V_{REF2}$. The error comparator 36 thus produces at its output a signal that is a function of the difference between the current produced by the switching converter 24 and a desired reference current and serves as a feedback signal for ensuring that the switching converter 24 operates at a desired constant current.

The output of the error comparator 36 is fed to a first input of a weighting unit 37 constituted by an adder whose second input is connected to the output of a feedback circuit 38 whose input is connected to the storage capacitor 19. The weighting unit 37 thus receives two voltage signals, one of which is a function of the voltage across the output capacitor 17 and the other of which is a summing function of the reference $V_{REF1}$ and the current produced by the switching converter 24 measured by current transformer 34. The reference $V_{REF1}$ is generated by calculating the difference between the average current measured by current transformer 34 and the output of the weighting circuit 37, that is equal to the PWM voltage reference $V_{REF1}$ (corresponding to pin 2 of the PWM controller 30 in FIG. 6). The weighting unit 37 sums these two voltage signals and feeds the resulting weighted voltage signal to the negative input of a PWM error comparator 39 (corresponding to pin 1 in the PWM controller 30), to whose positive input is connected the first voltage reference $V_{REF1}$. The output of the PWM error comparator 39 is thus a function of the difference between the first voltage reference $V_{REF1}$ and the weighted error signal derived by the weighting unit 37. The PWM controller 30 is responsive to the output of the PWM error comparator 39 for adjusting the duty cycle of the PWM switch 29. The duty cycle of the PWM switch 29 determines the extent to which the storage capacitor 19 is charged. As noted above, the storage capacitor 19 should be sufficiently charged that it maintains some residual voltage during the active portion of the cycle when the load switch 23 is closed. To achieve this requirement, the weighted error signal balances the feedback signal indicative of the voltage across the storage capacitor 19, whereby the duty cycle of the PWM switch 29 is adjusted to ensure that the output of the switching converter 24 will adequately charge the storage capacitor 19, during both the active and inactive portions of the cycle. This ensures that even during the active portion of the cycle when the load switch 23 is closed, the load 22 does not use all the energy stored in the storage capacitor 19 so that some residual voltage is always left in the storage capacitor 19. Were this not done, any slight voltage shortfalls would accumulate over time thus leading to the eventual failure of the storage capacitor 19 to provide sufficient voltage to the load 22 during the active portion of the cycle. Moreover, owing to the described operation of the weighting unit 37, the voltage fed to the load 22 is essentially supplied completely by the storage capacitor 19 and the voltage across the output capacitor 17 is substantially constant throughout the whole switching cycle.

The controlled switch power supply 14 (FIG. 3) thus operates to ensure that the energy supplied to the load 22 during the active portion of the switching cycle is stored by charging the storage capacitor 19 gradually at a constant current whose magnitude is adjusted by the average current processing unit 33 (FIG. 5) based on the power to be fed to the load 22 during a subsequent active portion of the switching cycle. This avoids sudden current surges on the input voltage source and avoids the need for a bulky RFI filter at the input of the power supply.

Figure 6:
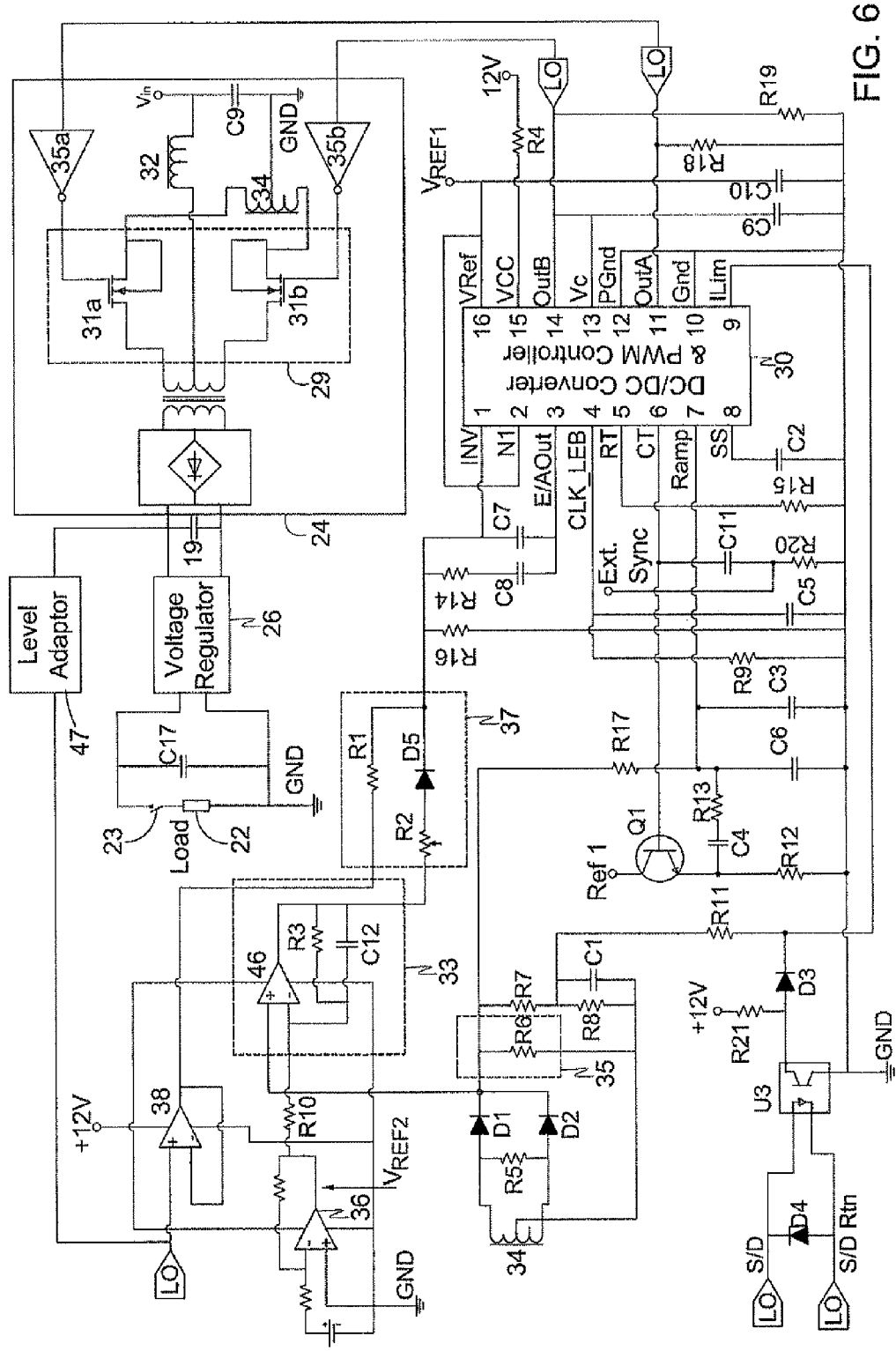
FIG. 6 is a high level circuit diagram showing details of the controlled power supply depicted functionally in FIG. 5.

Having described the principle of operation, there will now be described with reference to FIG. 6 a high level circuit diagram showing details of the controlled power supply 14 described functionally with reference to FIG. 5. The intention of FIG. 6 is to present how the components shown functionally in FIG. 5 can be implemented in is practice. Therefore, only the most salient features will be described since the circuit diagram provides a fully enabling disclosure sufficient for one skilled in the art to carry out the invention.

Thus, the heart of the controlled power supply 14 is an SG1825 controller 30 which controls the switching converter 24 and constitutes the PWM controller 30. The first voltage reference $V_{REF1}$ is fed to a voltage reference terminal (pin 16) thereof and positive and negative DC power supply rails are connected respectively to the Vcc and GND terminals (pins 13 and 12, respectively). The load current is sensed via the current transformer 34 across which are connected respective source terminals of a pair of MOSFET switches 41a and 41b whose drain terminals are commonly connected to a coil 32 that is part of the switching converter 24 and is connected to GND via the storage capacitor 19. The respective gate terminals of the MOSFET switches 31a and 31b are controlled by respective drivers 35a and 35b, that receive drive signals via the PWM output pins (11) and (14) of the SG1825 controller 30. The MOSFET switches 31a and 31b thus operate as the PWM switch 29 shown in FIG. 5.

For the sake of clarity the current transformer 34 is shown twice in the figure, i.e. in addition with regard to its connection to the SG1825 controller 30, it is also shown with regard to its signaling. Thus, its output representative of the current sensed by current transformer 34 is coupled via a pair of rectifier diodes D1 and D2, whose respective cathodes are commonly connected to a resistor R6, across which there is thus produced a voltage that is proportional to the current sensed by current transformer 34. The resistor R6 thus functions as the current-to-voltage converter 35 shown in FIG. 5. The positive terminal of the resistor R6 is connected to the positive input of an OP AMP 46 to whose negative input is fed the reference voltage $V_{REF2}$ via a resistor R10. The reference voltage $V_{REF2}$ is derived at the output of an OP AMP 36 that is connected as an inverting amplifier whose input is fed to a variable DC source. A capacitor C12 and a resistor R3 are connected between the negative input and the output of the OP AMP 46. The OP AMP 46 thus operates as an integrator and functions as the average current processing unit 33 shown in FIG. 5. In accordance with one embodiment, the values of the capacitor C12 and the resistor R10 are selected to set the integration averaging interval to be one order of magnitude larger than the largest expected pulse load interval.

The output of the OP AMP 46 is fed to a variable resistor VR1 connected to the anode of a rectifier diode D5, whose cathode is coupled to the inverting input (pin 1) of the SG1825 controller 30. The feedback voltage at the input of the voltage regulator 26, is coupled to the positive input of an OP AMP 38 that is configured as a feedback amplifier and is functionally equivalent to the feedback loop 38 shown in FIG. 5 through a level adaptor 47 connected as a voltage buffer whose output is coupled via a resistor R1 to the cathode of the rectifier diode D5 and thence to the inverting input of the SG1825 controller 30. The combination of the resistors R1 and VR1 together with the rectifier diode D5 thus functions as the weighting unit 37 shown in FIG. 5, whose output is the sum of the feedback voltage 38 and the output of the OP AMP 46, corresponding to the average current processing unit 33 shown in FIG. 5.

Pins 5 and 6 of the controller 40 allow for connection of external timing components $R_T$ and $C_T$ constituted by a resistor R20 and a capacitor C11 for adjusting the frequency of an internal oscillator. Pin 8 of the SG1825 controller 40 is a soft-start input that is held low when either the controller is in the micro-power mode, or when a voltage greater than +1.4 volts is present on pin 9. Thus, by applying a voltage signal of sufficient amplitude across the diode D4, the optocoupler U3 feeds a shut down signal via diode D3 to pin 9 of the controller.

FIGS. 7a to 7d are graphical representations showing current and voltage waveforms associated with the controlled power supply shown in FIG. 5 all drawn to a common time scale.

Figure 7A:
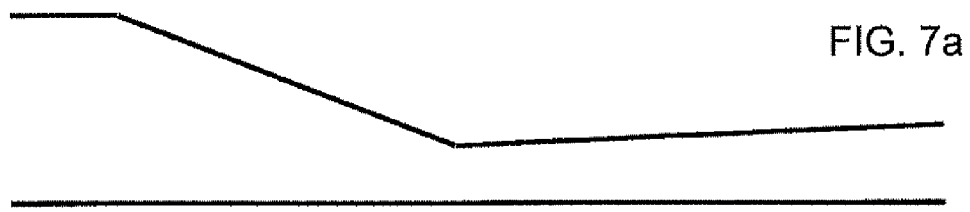
FIGS. 7a to 7d are graphical representations showing current and voltage waveforms associated with the controlled power supply shown in FIG. 5 all drawn to a common time scale.
Figure 7B:
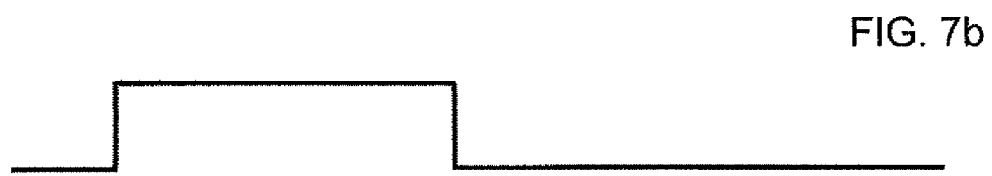
Figure 8:
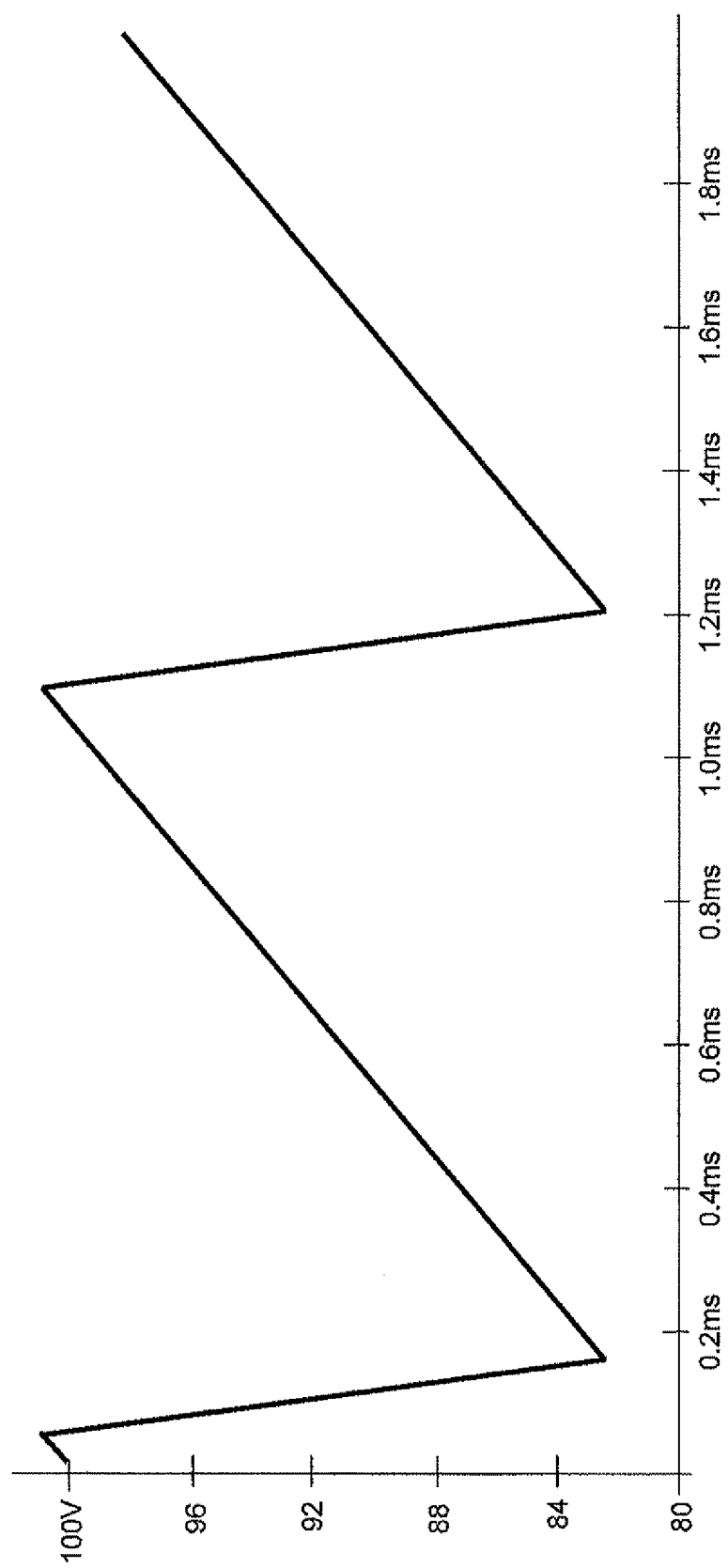

FIG. 8 is a timing diagram of the voltage waveform at the output of the switching converter. This corresponds to the waveform across the storage capacitor 19 as shown qualitatively in FIG. 7a. However, the time base in FIG. 7a is much more spread out in that the time for the voltage to fall from 101V to 82V is seen in FIG. 8 to be approximately 0.1 ms, which indicates that FIG. 7a shows the voltage only over a period of approximately 0.25 ms of which approximately 0.12 ms relates to the subsequent voltage increase, shown only partially in FIG. 7a. The time for the storage capacitor 28 to fully charge to its full voltage of 101V is seen in FIG. 8 to be just under 1 ms. This implies that only approximately 1-tenth the charging cycle is shown in FIG. 7a.

Figure 7C:
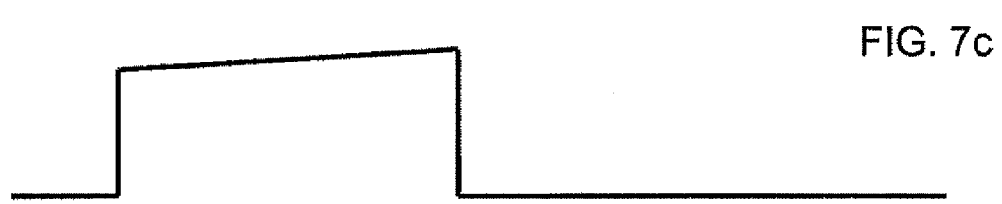
Figure 7D:
Figure 9:
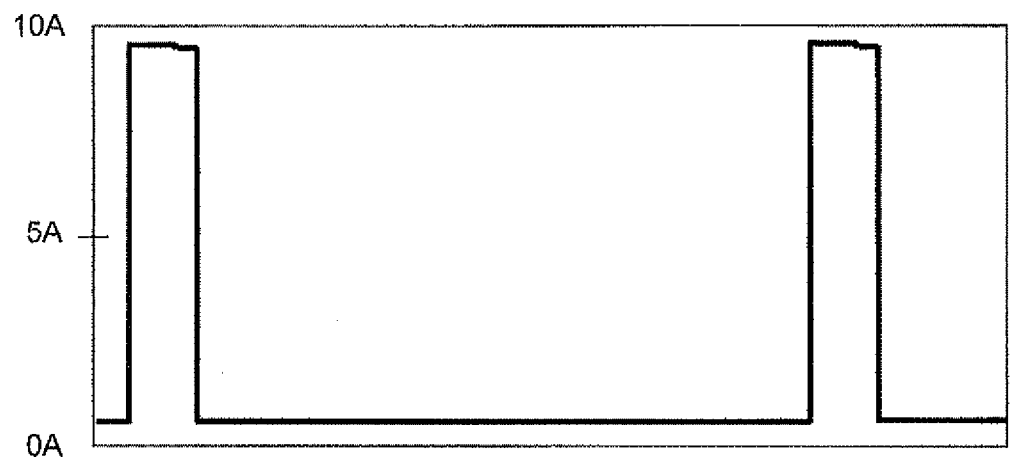
FIG. 9 is a timing diagram of the current waveform fed to the pulsed load shown in FIG. 7c.
Figure 10:
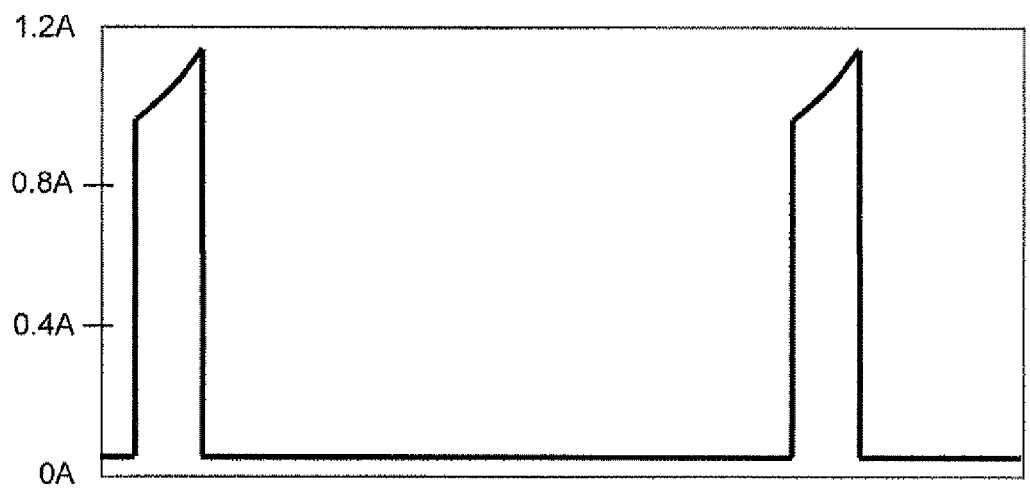
FIG. 10 is a timing diagram of the input current waveform to the regulator shown in FIG. 7d.

FIG. 9 is a timing diagram of the current waveform fed to the pulsed load 22 as shown qualitatively in FIG. 7c; and FIG. 10 is a timing diagram of the input current waveform to the regulator 26 as shown qualitatively in FIG. 7d. It emerges from a comparison of the time bases of FIGS. 9 and 10 with that of FIG. 7a that the pulse widths have an approximate duration of 0.1 ms (i.e. the time for the voltage across the storage capacitor 19 to fall from 101V to 82V), which is approximately 1-tenth of the duty cycle.

It thus emerges from the above discussion that the storage capacitor 19 is charged gradually over nine-tenths of its duty cycle and discharged abruptly across the load 22 for only one-tenth of the duty cycle, so that it stored voltage falls only from approximately 101V to 82V, thus maintaining most of its charge. By such means the load on the input remains substantially constant.

Although the invention has been described with particular regard to use of a DC power supply for supplying power to the load, it will be understood that a rectified AC power supply may also be used.

It will be understood that while the specific phased array antenna described above has four walls, in practice a different number of walls may be used so long as a required field of view can be achieved using all the walls.

Likewise, while the invention has been described with particular regard to supplying power to antenna elements of a phased array antenna, it will be appreciated that the principles of the invention may find application also with regard to other types of pulse load, particular where a plurality of pulse loads must be sequentially energized at different points of a supply cycle.

The invention claimed is:

1. A controlled power supply configured to supply bursts of substantially constant voltage to a plurality of pulse loads via a load switch, said power supply comprising:
   a plurality of storage capacitors, each coupled to a plurality of pulse loads; and
   an average current processing unit operable to compute for each of the storage capacitors an average current that is fed to the storage capacitor, in response to an estimation of the current that is to be sourced by the respective plurality of pulse loads coupled to the storage capacitor during an active portion of a switching cycle of the respective plurality of pulse loads;
   wherein each of the storage capacitors is coupled to a controller of the controlled power supply, the controller being configured to control a magnitude of a substantially constant current that continuously supplies energy to the storage capacitor to correspond to the average current computed for the storage capacitor.

2. The controlled power supply according to claim 1, wherein each of the storage capacitors is configured: (a) to store energy during both active and inactive portions of the respective load switching cycle; and (b) to supply stored energy to the respective plurality of pulsed loads during the active portion of the load switching cycle.

3. The controlled power supply according to claim 1, comprising a plurality of switch power supplies coupled to each of the storage capacitors and to the respective plurality of pulse loads.

4. The controlled power supply according to claim 3, wherein each of the storage capacitors is configured to supply the stored energy to the respective switch power supply to which the storage capacitor is coupled, and then to each of the pulse loads, during the active portion of the load switching cycle; wherein for each of the switch power supplies there is comprised a controller operatively coupled to the average current processing unit configured to supply continuous energy to the respective storage capacitor at the computed substantially constant current.

5. The controlled power supply according to claim 3, wherein for each of the storage capacitors the controlled power supply comprises: (a) a switching converter controlled by a PWM switch for coupling to a voltage source and producing an output voltage; and (b) an output capacitor for storing energy and for supplying the stored energy to the pulse load during the active portion of the respective load switching cycle; wherein the controller being coupled to the switching converter for pulse width modulating the PWM switch.

6. The controlled power supply according to claim 1, wherein the average current processing unit comprises an integrator having a capacitor and a resistor selected so as to set an integration averaging interval of the integrator to be an order of magnitude larger than the largest expected pulse load interval of the switching converter.

7. The controlled power supply according to claim 1, wherein for each of the storage capacitor the controller is configured to generate switching signals for closing and opening said load switch at a rate and duty cycle that is commensurate with respective durations of the active portion and the inactive portion of the respective switching cycle.

8. The controlled power supply according to claim 1, wherein the pulse loads are antenna elements of a phased array antenna.

9. The controlled power supply according to claim 1, comprising for each of the storage capacitors a converter operable to convert input voltage inputted to it to an output of a different voltage that is fed to the storage capacitor; wherein an output of the converter exceeds a voltage of 82 Volts.

10. A phased array antenna system comprising:
a plurality of modules each containing a plurality of antenna elements adapted to scan over a predetermined field of view; and
a respective controlled power supply, according to claim 1, for supplying power to the antenna elements in each module.

11. A method of supplying bursts of substantially constant voltage to a plurality of pulse loads, the method comprising:
for each out of a plurality of storage capacitors, each coupled to a plurality of pulse loads, computing an average current that is fed to the storage capacitor, in response to an estimation of the current that is to be sourced by the respective plurality of pulse loads coupled to the storage capacitor during an active portion of a switching cycle of the respective plurality of pulse loads;
continuously supplying energy to each of the storage capacitors at a substantially constant current; and
for each of the storage capacitors, controlling a magnitude of a substantially constant current that continuously supplies energy to the storage capacitor to correspond to the average current computed for the storage capacitor.

12. The method according to claim 11, comprising storing energy in each of the storage capacitors during both active and inactive portions of a load switching cycle of the respective pulse loads, for feeding voltage to the respective pulse loads during an active portion of the load switching cycle.

13. The method according to claim 12, comprising supplying the energy, stored in each respective storage capacitor, to a respective switch power supply to which the storage capacitor is coupled and which is coupled to the respective plurality of pulse loads, and then to each of the respective plurality of pulse loads during the active portion of the load switching cycle.

14. The method according to claim 11, further comprising for each of the storage capacitors: (a) feeding energy to the storage capacitor via a switching converter; and (b) varying a duty cycle of the switching converter to produce a desired average current.

15. The method according to claim 11, further comprising for each of the storage capacitors: varying the duty cycle of the switching converter so as to maintain the current supplied by the switching converter at a level slightly above an average current required by the respective pulse loads.

16. The method according to claim 11, wherein the pulse loads are antenna elements of a phased array antenna.

* * * * *